US008707059B2

(12) United States Patent
Christianson et al.

(10) Patent No.: US 8,707,059 B2
(45) Date of Patent: Apr. 22, 2014

(54) END TO END ENCRYPTION FOR INTRUSION DETECTION SYSTEM

(75) Inventors: Joel Curtis Christianson, Corcoran, MN (US); Gregory Brett Olson, Woodbury, MN (US)

(73) Assignee: Cinch Systems, Inc., St. Michael, MN (US)

( * ) Notice: Subject to any disclaimer, the term of this patent is extended or adjusted under 35 U.S.C. 154(b) by 284 days.

(21) Appl. No.: 12/986,670

(22) Filed: Jan. 7, 2011

(65) Prior Publication Data

US 2012/0179921 A1 Jul. 12, 2012

(51) Int. Cl.
*H04L 9/00* (2006.01)
*G08B 29/00* (2006.01)

(52) U.S. Cl.
USPC ............................ 713/194; 340/531; 348/152

(58) Field of Classification Search
USPC ........................................... 3/34, 35; 713/194
See application file for complete search history.

(56) References Cited

U.S. PATENT DOCUMENTS

2002/0147982 A1* 10/2002 Naidoo et al. ................ 725/105

OTHER PUBLICATIONS

Videofied "MotionViewer camera DCV" (2009) 2 page.*
Honeywell IntelliSense IS2560/IS2560T Passive Infrared Motion Installation Instructions (2005); retrived Jun. 28, 2013 from http://site.geoarm.com/pdfs/Honeywell/is2560-install-guide.pdf.*
Emea Sales, "Control Panel Videofied Visio: Product Specifications Sheet", (2009), 2 pgs.

* cited by examiner

*Primary Examiner* — Gilberto Barron, Jr.
*Assistant Examiner* — Devin Almeida
(74) *Attorney, Agent, or Firm* — Schwegman Lundberg & Woessner, P.A.

(57) ABSTRACT

An intrusion detection module includes an enclosure and a sensor to detect a predetermined type of intrusion. The module further includes a tamper sensor to detect a tampering attempt. An encryption mechanism is coupled to receive signals from the sensor and tamper sensor and encrypt such signals for transmission to a control panel.

18 Claims, 4 Drawing Sheets

END TO END ENCRYPTION FOR INTRUSION DETECTION SYSTEM

BACKGROUND

Intrusion detection systems for high security facilities, such as government embassies should be secure from tampering. Many such systems have hardwired connections for communication between modules and panels and control centers. Encryption may be used on such communication to minimize the chances of interception of communications and commensurate attempts to defeat the intrusion detection system.

SUMMARY

An intrusion detection module includes an enclosure and a sensor to detect a predetermined type of intrusion. The module further includes a tamper sensor to detect a tampering attempt. An encryption mechanism is coupled to receive signals from the sensor and tamper sensor and encrypt such signals for transmission to a control panel. The encryption mechanism may be located within the module to protect against tampering.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on a storage device, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
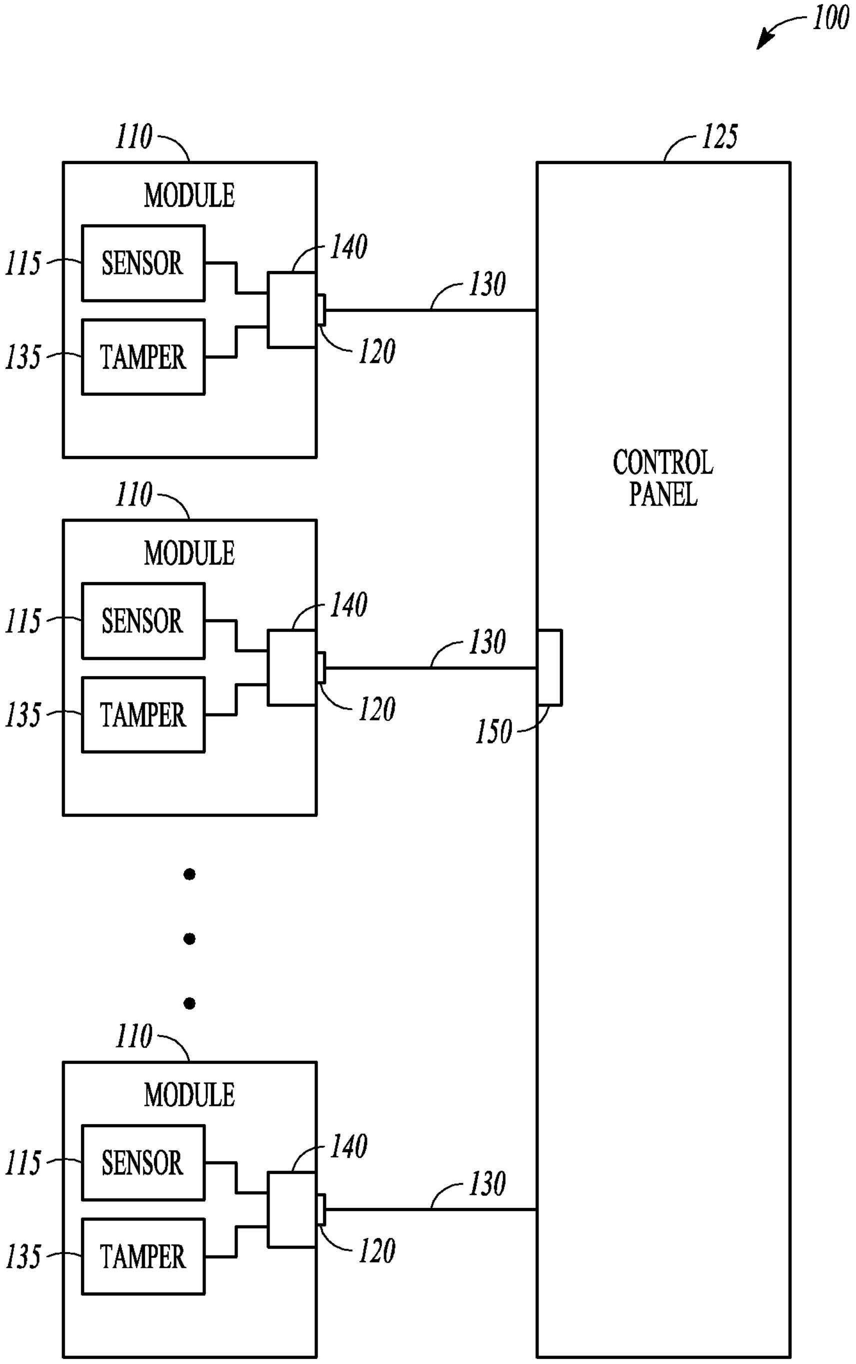
FIG. 1 is a block diagram of an intrusion detection system according to an example embodiment.

An intrusion detection system 100 is illustrated in block diagram form in FIG. 1. A plurality of modules 110 have sensors 115 to monitor for intrusion, and also have a port 120. At least one control panel 125 is coupled to the module ports 120 via wires 130. Communications over the wires 130 are encrypted. The sensors 115 are encapsulated within the modules 110 and coupled to the port 120. Each module includes at least one tamper sensor 135 to detect attempts to tamper with the module.

In one embodiment, each module includes a protected space that is protected against tampering to ensure security of communications from the sensors to the control panel. The port includes a circuit board 140 having encryption functions to encrypt sensor readings. In some embodiments, the circuit board 140 is housed within the protected space within the module 110. The circuit board 140 provides serial two wire differential communications via the port 120 in some embodiments. In one embodiment, the circuit board provides 16 bytes of data for every communication.

The circuit board 140 in one embodiment encrypts tamper information generated by tamper detection sensors 135 when attempts to tamper with the module 110 are detected. The circuit board 140 has a header to connect to components within the module, wherein the header includes pins for a supply voltage, ground, sensor value, and one or more tamper switches. The circuit board 140 is adapted to couple to a supply voltage, such as a battery or external power supply, ground, and A and B channels of the two wire differential communication wire. The circuit board 140 may be potted in epoxy, and in some embodiments has a header that pins may be slid into to communicate with the circuit board. The header may include a power supply connection, ground, zone, and multiple tamper connections. The zone corresponds to the type of intrusion or parameter being detected, such as a motion, contact switch, etc. In further embodiments, the header includes a supply connection, such as 12V supply, ground, and a 485 differential connection. The encryption provided may be AES 128 bit encryption in one embodiment.

In one embodiment, the modules 110 may include a door switch sensor, motion detector sensor, keypad, and other modules. Communications between the modules and the control panel are encrypted. Enclosing the circuit board 140 within the modules in combination with the module tamper detection, significantly reduces the vulnerability to tampering going undetected due to the encryption of communications between the module and the control panel. In some embodiments, the wired connection may be formed by individual lines from each module to the control panel, or may include a control panel bus, with each module coupled to the bus. In further embodiments, communications between the modules and control panel may be by encrypted wireless transceivers, also represented at 120 and 140 in the modules and at 150 in control panel 125.

Figure 2:
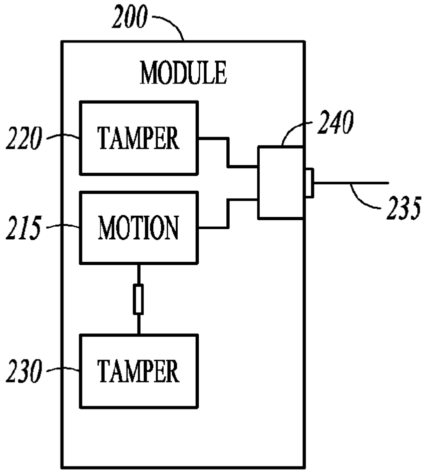
FIG. 2 is a block diagram of a motion detection module according to an example embodiment.

An example module 200 in FIG. 2 is a tamper resistant motion detector module. Inside the module 200 are two switches 215 and 220. Switch 215 is a motion detection switch coupled to an opening or lens 225. Motion detection switch 215 changes state to indicate the presence or absence of motion. Switch 220 is a tamper detection switch to make sure the motion detector module 200 is not tampered with. Tampering is detected when the module is removed from a mounting or has a cover opened. In one embodiment, an addition tamper detection switch 230 changes state if an attempt is made to mask the detection of motion by covering the lens 225.

Figure 3:
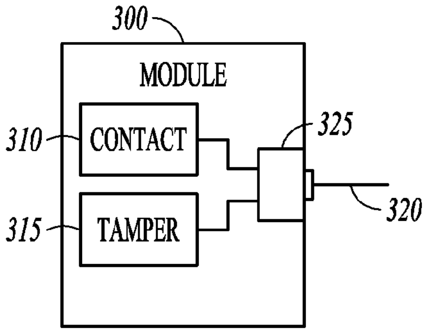
FIG. 3 is a block diagram of a contact detection module according to an example embodiment.

An example door/window contact module 300 in FIG. 3 operates in a manner similar to module 200. A contact detector switch 310 is used to detect the opening or closing of a door or window being protected. A tamper detection switch 315 is used to indicate if someone is trying to tamper with the detector switch by physical or magnetic manipulation.

In FIGS. 2 and 3, wires 235 and 320 respectively, indicate the state of the detectors by the voltages on the switches. Each of the wires leaving the module in one embodiment is coupled to an input module 240, 325 inside the modules 200 and 300 respectively. The input modules 240, 325 correspond to circuit board 140 in FIG. 1, and encrypt the signals on the wires, which may be coupled to a control panel in one embodiment. The input modules providing the encrypting lay inside the area of the modules 200 and 300 that are protected by the tampering protection switches. Since the sensing modules also lie within the protected area of the modules, unencrypted signals within the modules 200 and 300 may not be interfered, modified, or eavesdropped on without first tripping a tamper switch. The tripping of a tamper switch may result in a notice or alarm being generated by the control panel.

Figure 4:
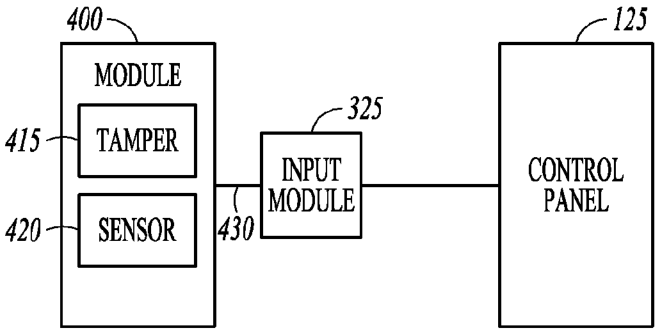
FIG. 4 is a block diagram of an alternative detecting device according to an example embodiment.

In some embodiments, when the detecting device is too small to allow mounting of a miniature input module inside a detector module, an input module may be placed as close to the detector switch as possible, minimizing the length of wires carrying unencrypted signals. An example of such a module is shown at 400 in FIG. 4, coupled to a control panel 410. The module 400 includes a tamper detection switch 415 and a sensor switch 420, both coupled to an input module 425 by a short length of wire 430. Input module 425 encrypts signals from module 400 before providing them to control panel 410. Wire or wires 430 may be very short, such as 1 cm or less in some embodiments to reduce the ability to detect signals on the wire, and as short as possible given the environment in which the detector module is being used.

Figure 5:
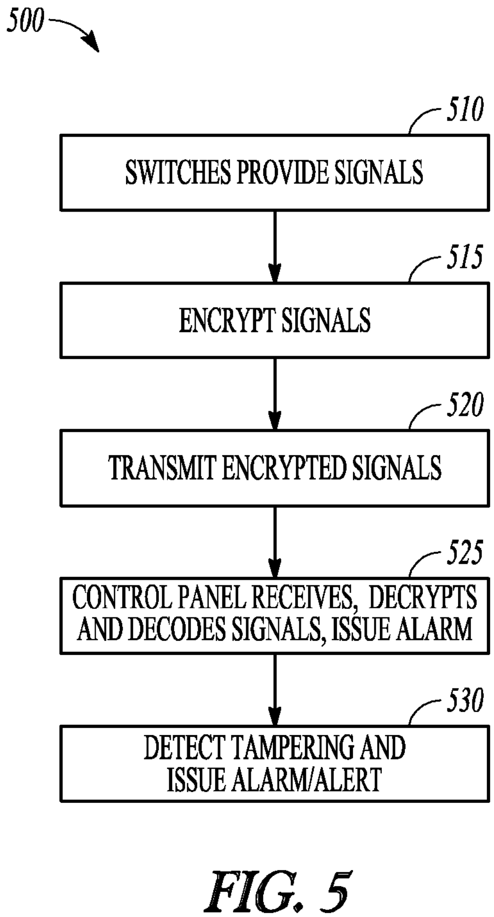
FIG. 5 is a flow chart illustrating a method of detecting alarm and tamper conditions according to an example embodiment.

In one embodiment, the detection system 100 implements a method illustrated in flow chart form at 500 in FIG. 5. At 510, switches in a module provide signals to the circuit board. The switches correspond to the parameter being sensed, such as motion, or a contact, as well as one or more signals representative of tampering. At 515, the signals are encrypted by the circuit board and provided external to the module via wired or wireless transmission at 520. The signals are received by the control panel at 525, decrypted, and decoded to determine whether an alarm or alert should be issued. The alarm or alert may be issued as a function of motion or opening of a door or window, or one of many sensed parameters for the different types of modules. The control panel at 530 detects whether one or more tamper switches are signaling a tamper event, and can also issues alarms or alerts representative of tampering, and in some embodiments, the type of tampering represented by the signals from different tampering switches.

Figure 6:
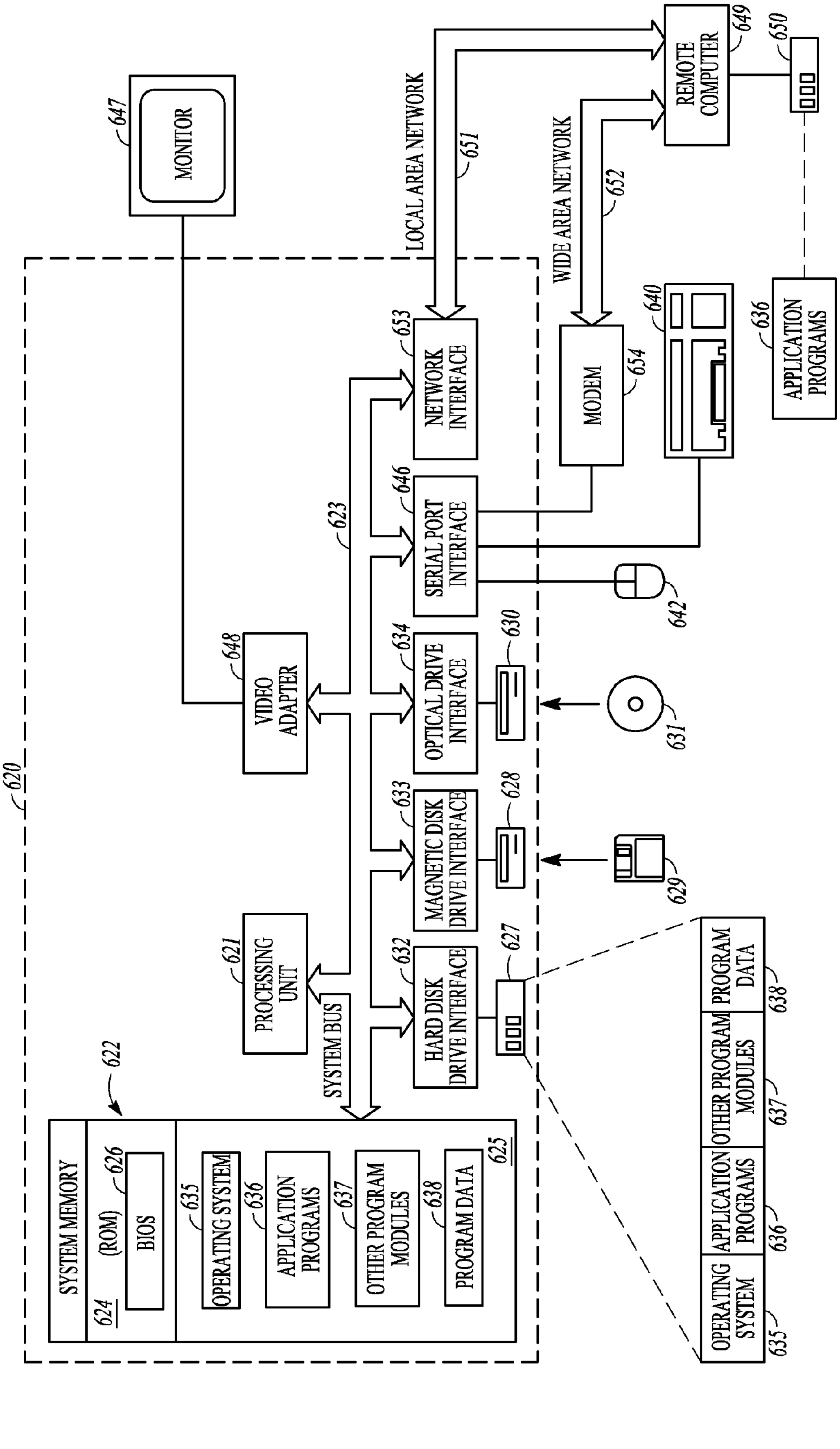
FIG. 6 is a block diagram of an example computer system for implementing one or more methods or functions according to an example embodiment.

In the embodiment shown in FIG. 6, a hardware and operating environment is provided that may be used to implement at least a portion of the methods described with respect to the modules and control panel. As shown in FIG. 6, one embodiment of the hardware and operating environment includes a general purpose computing device in the form of a computer 620 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 620 comprises a single central-processing unit (CPU), or a plurality of processing units, commonly referred to as a multiprocessor or parallel-processor environment. In various embodiments, computer 620 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 620, such as during start-up, may be stored in ROM 624. The computer 620 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 620. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 620 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 620 may operate in a networked environment using logical connections to one or more remote computers or servers, such as remote computer 649. These logical connections are achieved by a communication device coupled to or a part of the computer 620; the invention is not limited to a particular type of communications device. The remote computer 649 can be another computer, a server, a router, a network PC, a client, a peer device or other common network node, and typically includes many or all of the elements described above 110 relative to the computer 620, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks. When used in a LAN-networking environment, the computer 620 is connected to the LAN 651 through a network interface or adapter 653, which is one type of communications device. In some embodiments, when used in a WAN-networking environment, the computer 620 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 620 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. An intrusion detection system comprising:

a plurality of modules having sensors to monitor for intrusion, each module having a port;

at least one control panel to receive encrypted communications from the ports via a differential two wire connection; and wherein the sensors are encapsulated within the modules and coupled to the port, and further wherein each module includes at least one tamper sensor to detect attempts to tamper with the module.

2. The system of claim 1 wherein the module comprises a protected space that is protected against tampering to ensure security of communications from the sensors to the control panel.

3. The system of claim 1 wherein the port comprises circuit board having encryption functions to encrypt sensor readings.

4. The system of claim 3 wherein the circuit board provides 16 bytes of data for every communication.

5. The system of claim 3 wherein the circuit board encrypts tamper information generated when attempts to tamper with the module are detected.

6. The system of claim 3 wherein the circuit board has a header to connect to components within the module, wherein the header includes connectors for a supply voltage, ground, sensor value, and at least one tamper switch.

7. The system of claim 6 wherein the circuit board has an output to couple to the supply voltage, ground, and A and B channels of the two wire differential communication connection.

8. The system of claim 1 wherein at least one module is a keypad.

9. The system of claim 1 wherein at least one module is a motion detector.

10. An intrusion detection module comprising:

an enclosure;

a switch sensor to detect a predetermined type of intrusion;

a tamper sensor to detect a tampering attempt; and an encryption mechanism coupled to receive signals from the sensor and tamper sensor and encrypt such signals for transmission via a differential two wire connection to a control panel.

11. The module of claim 10 wherein the sensor, tamper sensor, and encryption mechanism are positioned within the enclosure.

12. The module of claim 11 wherein the tamper sensor detects attempts to tamper with the enclosure.

13. The module of claim 11 wherein the tamper sensor detects attempts to tamper with the sensor.

14. The system of claim 10 wherein the switch comprises motion detection switch coupled to a lens, the enclosure comprises a protected space that is protected against tampering to ensure security of communications from the motion detection switch and tamper sensor to the control panel, and wherein the tamper sensor includes a sensor to detect attempts to open the enclosure and a sensor to detect covering of the lens.

15. A method comprising:

sensing a predetermined type of intrusion via a contact switch based intrusion detection sensor;

sensing a tampering attempt via a tamper detection sensor;

encrypting sensed information from the intrusion detection sensor and the tamper detection sensor; and transmitting the encrypted sensed information via a differential two wire connection to a control panel.

16. The method of claim 15 wherein the sensor, tamper sensor, and encryption mechanism are positioned within an enclosure.

17. The method of claim 16 wherein the tamper sensor detects attempts to tamper with the enclosure.

18. The method of claim 16 wherein the tamper sensor detects attempts to tamper with the sensor by magnetic manipulation.

* * * * *